US010845804B2

(12) United States Patent
Holgersson et al.

(10) Patent No.: US 10,845,804 B2
(45) Date of Patent: Nov. 24, 2020

(54) PARCEL MAPPING VIA ELECTRICAL RESISTANCE DETECTION OF A ROBOTIC VEHICLE

(71) Applicant: HUSQVARNA AB, Huskvarna (SE)

(72) Inventors: Jonas Holgersson, Huskvarna (SE); Fredrik Kallström, Huskvarna (SE); Jon Funk, Concord, NC (US); Nick Schomer, Charlotte, NC (US); Mario D'Ovidio, Cornelius, NC (US)

(73) Assignee: HUSQVARNA AB, Huskvarna (SE)

( * ) Notice: Subject to any disclaimer, the term of this patent is extended or adjusted under 35 U.S.C. 154(b) by 2 days.

(21) Appl. No.: 15/535,730

(22) PCT Filed: Nov. 10, 2015

(86) PCT No.: PCT/IB2015/058668

§ 371 (c)(1),
(2) Date: Jun. 14, 2017

(87) PCT Pub. No.: WO2016/097896

PCT Pub. Date: Jun. 23, 2016

(65) Prior Publication Data

US 2018/0253096 A1 Sep. 6, 2018

Related U.S. Application Data

(60) Provisional application No. 62/093,669, filed on Dec. 18, 2014, provisional application No. 62/097,461, filed on Dec. 29, 2014.

(51) Int. Cl.

| | |
|---|---|
| ***G05D 1/00*** | (2006.01) |
| ***G05D 1/02*** | (2020.01) |
| ***A01D 34/00*** | (2006.01) |

(52) U.S. Cl.
CPC ......... *G05D 1/0088* (2013.01); *A01D 34/008* (2013.01); *G05D 1/0225* (2013.01);
(Continued)

(58) Field of Classification Search
USPC .......................................................... 701/25
See application file for complete search history.

(56) References Cited

U.S. PATENT DOCUMENTS

2011/0166701 A1* 7/2011 Thacher ................ A01G 25/00
700/245
2012/0101679 A1* 4/2012 Anderson ........... G05D 1/0088
701/23

(Continued)

FOREIGN PATENT DOCUMENTS

EP 2342964 A1 7/2011
EP 2390741 A2 11/2011
EP 2767150 A1 8/2014

OTHER PUBLICATIONS

International Search Report and Written Opinion for International Application No. PCT/IB2015/058668 dated Feb. 25, 2016.

(Continued)

*Primary Examiner* — Aniss Chad
*Assistant Examiner* — Mahmoud M Kazimi
(74) *Attorney, Agent, or Firm* — Burr & Forman, LLP

(57) ABSTRACT

A method for determining and mapping a parcel of land may include receiving positioning-information indicative of position data of a robotic vehicle transiting a parcel at one or more locations on the parcel and receiving workload-information indicative of workload data of a robotic vehicle transiting the parcel at one or more locations on the parcel. The method may further include generating a virtual map of the parcel based on the positioning-information and the workload-information received.

20 Claims, 11 Drawing Sheets

42
44
46
40
54
12
10
30
20

(52) U.S. Cl.
CPC ......... *G05D 1/0242* (2013.01); *G05D 1/0265* (2013.01); *G05D 1/0272* (2013.01); *G05D 1/0274* (2013.01); *G05D 2201/0208* (2013.01)

(56) References Cited

U.S. PATENT DOCUMENTS

| | | | | |
|---|---|---|---|---|
| 2012/0265391 | A1* | 10/2012 | Letsky ................ | G05D 1/0088 701/25 |
| 2013/0041526 | A1* | 2/2013 | Ouyang ............... | A01D 34/008 701/2 |
| 2013/0167495 | A1* | 7/2013 | Borinato .............. | A01D 34/006 56/10.2 G |
| 2016/0165795 | A1* | 6/2016 | Balutis ................ | G05D 1/0088 701/25 |

OTHER PUBLICATIONS

International Preliminary Report on Patentability for International Application No. PCT/IB2015/058668 dated Jun. 20, 2017.

* cited by examiner

PARCEL MAPPING VIA ELECTRICAL RESISTANCE DETECTION OF A ROBOTIC VEHICLE

CROSS REFERENCE TO RELATED APPLICATIONS

The present application claims priority to U.S. patent application No. 62/093,669 filed Dec. 18, 2014 and 62/097,461 filed Dec. 29, 2014, both of which are expressly incorporated by reference in their entirety.

TECHNICAL FIELD

Example embodiments generally relate to robotic devices and, more particularly, relate to a robotic device that is configurable to facilitate identification of discrete areas within a parcel of land that generally require increased and/or reduced energy output for operating the robotic device in these areas.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Robotic mowers are typically capable of transiting over even and uneven terrain to execute yard maintenance activities relating to mowing. They may be programmed to stay within a defined area while performing their mowing tasks, and may even be configured to perform other tasks in the defined area. Thus, it may be desirable to expand the capabilities of robotic mowers to improve their utility and functionality.

BRIEF SUMMARY OF SOME EXAMPLES

Some example embodiments may therefore provide a robotic vehicle that can employ one or more sensors (e.g., amperage sensor monitoring the electrical draw on a cutting deck mower, amperage sensor monitoring the electrical draw on a drive motor for propelling the wheels of the robotic vehicle, etc.) for use in connection with determining and mapping of a parcel of land so that, for example, a virtual map and/or graphical representation of the parcel of land can be generated which illustrates, for example, one or more areas of elevated workload areas (e.g., areas in which the robotic vehicle expends an increased level of energy to operate), reduced workload areas (e.g., areas in which the robotic vehicle expends a reduced level of energy to operate), or both.

In an example embodiment, a method for determining and mapping a parcel of land or garden may include receiving positioning-information indicative of position data of a robotic vehicle transiting a parcel at one or more locations on the parcel and receiving workload-information indicative of workload data of a robotic vehicle transiting the parcel at one or more locations on the parcel. The method may further include generating a virtual map of the parcel based on the positioning-information and the workload-information received.

In another example embodiment, an apparatus for determining and mapping a parcel of land or garden may include processing circuitry configured for receiving positioning-information indicative of position data of a robotic vehicle transiting a parcel at one or more locations on the parcel. The processing circuitry may further be configured for receiving workload-information indicative of workload data of a robotic vehicle transiting the parcel at one or more locations on the parcel, and generating a virtual map of the parcel based on the positioning-information and the workload-information received Some example embodiments may improve the ability of robotic vehicles to provide utility for garden owners or other operators, specifically by enabling the garden owners or operators to generate and/or reference virtual maps and/or graphical representations of the garden based on positioning-information data and workload-information gathered by the robotic vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
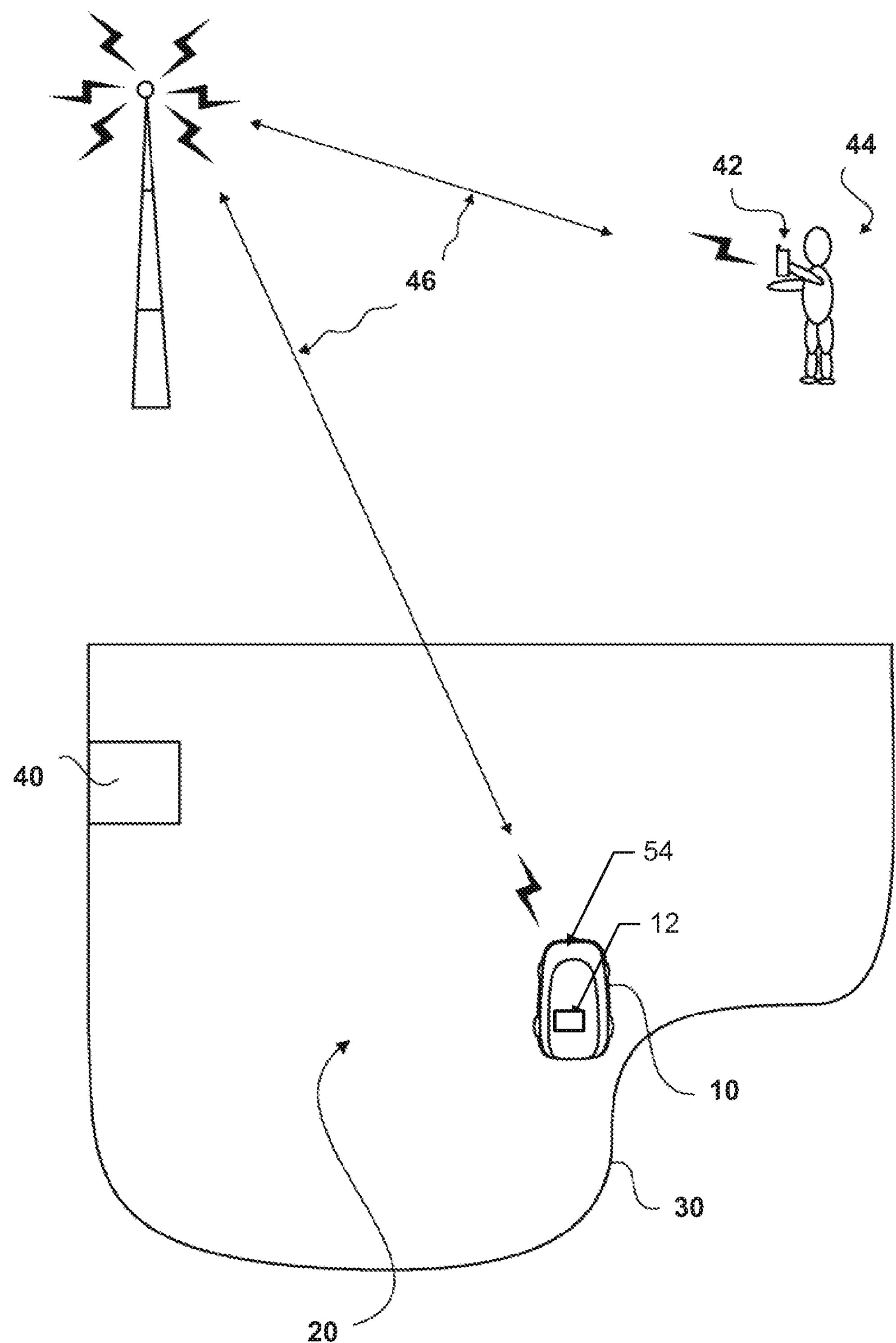
FIG. 1 illustrates an example operating environment for a robotic vehicle that may employ an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "garden" is meant to relate to any yard, parcel, grounds, or other property that is maintained and/or monitored using equipment. As such, the terms garden or parcel could refer to an area in which various varieties of vegetation could be cultivated including, for example, grasses, trees, bushes, shrubs, flowers, vegetables, fruits, herbs and/or the like. As used herein, operable coupling should be understood to relate to direct or indirect connection that, in either case, enables functional interconnection of components that are operably coupled to each other.

In an example embodiment, a robotic vehicle (e.g., a robotic mower, mobile sensing device, watering device and/or the like) may be provided with one or more sensors suitable for directly or indirectly monitoring or detecting the amount of energy output (e.g., workload) required for the robotic vehicle, such as one or more amperage sensors detecting the draw of electrical current associated with one or more motors, in addition to any other sensors or functional components that the robotic vehicle may carry. For instance, an amperage sensor can detect and/or monitor the draw of electrical current associated with operation of a functional component (e.g., cutting deck motor driving a blade) over time. In addition to or alternatively, for example, an amperage sensor can detect and/or monitor the draw of electrical current associated with movement (e.g., transiting of across a parcel) of the robotic vehicle over time. For instance, an amperage sensor may be provided to monitor the draw of electrical current associated with the operation of the drive motor that propels the robotic vehicle.

In some embodiments, for example, the robotic vehicle may be equipped with sensors capable of measuring the resistance applied to the wheels of the robotic vehicle as the robotic vehicle transits over ground. For example an amperage sensor can measure the draw of electrical current for a motor associated with driving the wheels of the robotic vehicle. In this regard, such an amperage sensor indirectly measures the resistance applied to the wheels of the robotic vehicle as the robotic vehicle transits over a terrain. The workload measurement (e.g., resistance measurements via amperage data) may be stored in association with the location at which the measurements are gathered. As an alternative (or addition) to indirectly recording resistance via an amperage sensor monitoring and/or measuring the draw of electrical current for a motor associated with driving the wheels of the robotic vehicle, the power or energy needed to cut vegetation, for example, in different areas may be recorded. For example, a different amperage sensor can monitor and/or measure the draw of electrical current for a motor associated with driving a functional element (e.g., a cutting blade) of the robotic vehicle. Also this workload measurement may be stored in association with the location at which the measurements are gathered.

FIG. 1 illustrates an example operating environment for a robotic mower 10 that may employ an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is a boundary wire, the boundary wire may emit electrical signals that are detectable by the robotic mower 10 to inform the robotic mower 10 when the boundary 30 of the parcel 20 has been reached.

The robotic mower 10 may be controlled, at least in part, via control circuitry 12 located onboard. The control circuitry 12 may include, among other things, one or more amperage sensors (e.g., a first amperage sensor associated with driving a functional component and a second amperage sensor associated with driving the wheels of the mower), a positioning module, and an image capture module, which will be described in greater detail below. Accordingly, the robotic mower 10 may utilize the control circuitry 12 to define a path for coverage of the parcel 20 in terms of performing a task over specified portions (e.g., discrete areas further defined within the entire parcel) or the entire parcel 20. In this regard, the positioning module may be used to guide the robotic mower 10 over the parcel 20 (or discrete areas defined therein) and to ensure that full coverage (of at least predetermined portions of the parcel 20) is obtained, while the amperage sensor(s) detects and captures workload-information (e.g., amperage associated with one or more motors associated with operation of the robotic vehicle). If desired, the image capture module may detect objects and capture image data regarding the surroundings of the robotic mower 10 while the parcel 20 is traversed.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system, including a motor associated with propelling the robotic mower 10, and a blade control system, including a motor associated with a cutting blade, of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel or discrete areas therein, while operating a cutting blade to cut the vegetation (e.g., grass) on the parcel 20.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via a wireless communication network 46. However, the wireless network 46 and other remote devices may not be employed in some embodiments. For example, the charge station 40 may have a wired connection to a computer of the remote operator 44. In embodiments where the wireless network 46 is employed, the wireless network 46 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless network 46 and the devices or databases (e.g., servers, electronic device 42, control circuitry 12) may be accomplished by either wireline or wireless communication mechanisms and corresponding protocols.

Figure 2B:
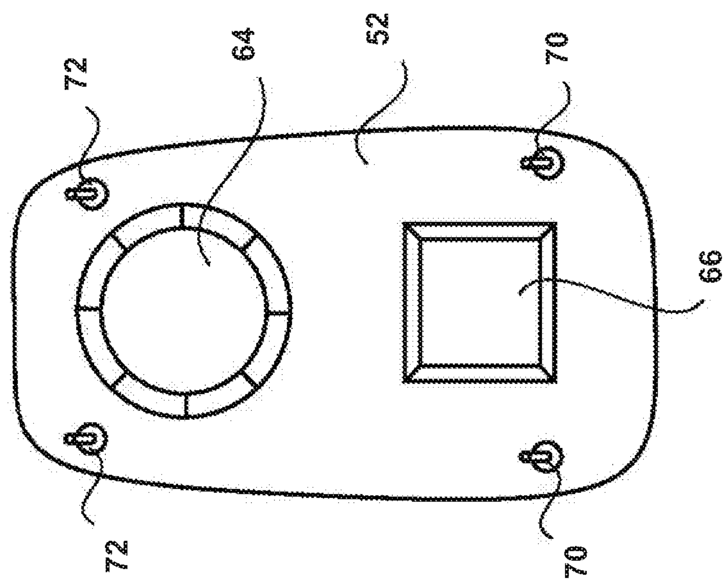
FIG. 2B illustrates a schematic view of an inner housing and various other components of the robotic vehicle according to an example embodiment.
Figure 2A:
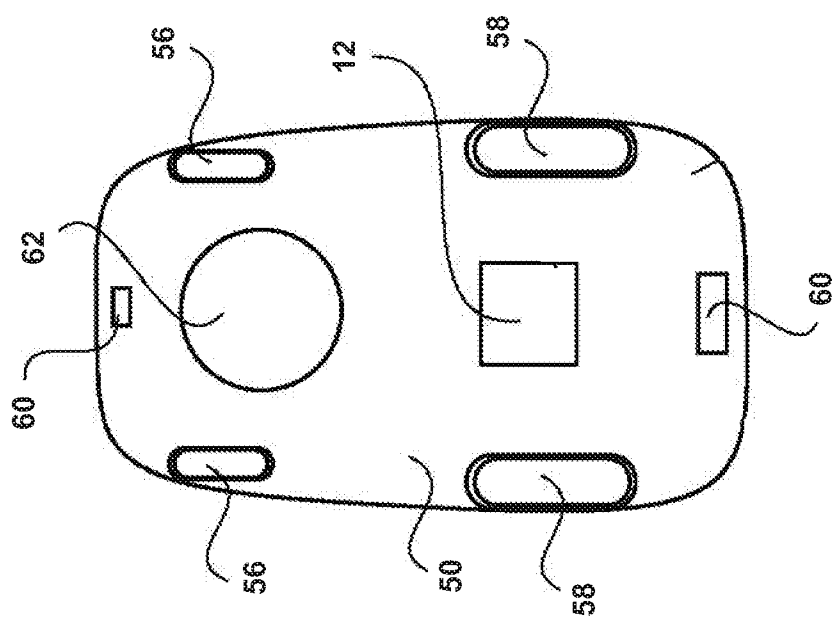
FIG. 2A illustrates a schematic view of a base plate and various components of the robotic vehicle according to an example embodiment.

FIG. 2, which includes FIGS. 2A and 2B, illustrates some of the parts that may be employed in connection with an example of the robotic mower 10. However, it should be appreciated that example embodiments may be employed on numerous other vehicles that may employ different designs. As such, components described may be excluded in some embodiments and/or additional components may be provided. Moreover, the locations of some components may be moved in some embodiments. FIG. 2A illustrates a schematic view of a base plate and various components of the robotic mower according to an example embodiment and FIG. 2B illustrates a schematic view of an inner housing and various other components of the robotic mower according to an example embodiment.

Referring to FIGS. 1 and 2, the robotic mower 10 of one example embodiment may include a base plate 50, an inner housing 52 and an outer housing 54. The inner housing 52 may be configured to be arranged on top of a base plate 50 and the outer housing 54 may be configured to be arranged on top of the inner housing 52. The base plate 50 may form a support structure from which one or more front wheels 56 and one or more rear wheels 58 may be supported. In some embodiments, the one or more rear wheels 58 may be relatively large as compared to the one or more front wheels 56. Moreover, the one or more rear wheels 58 may be configured to operate either in a forward or backward direction, but may otherwise not be steerable. However, the one or more front wheels 56 may be steerable responsive to control by the control circuitry 12. Alternatively, the front wheels 56 may be swivel wheels capable of following any direction as required by the control of the rear wheels 58.

In an example embodiment, the base plate 50 may further include one or more sensors 60 that may be used to detect the boundary 30 and/or objects that may form part of the boundary of the parcel. The sensors 60 may also detect various parameters, conditions, objects and/or the like that may be encountered during operation of the robotic mower 10 within the boundary 30 of the parcel 20. In relation to object detection, the objects may be fixed or temporary (e.g., movable) objects. In some cases, the sensors 60 may include a front sensor and a rear sensor. However, it should be appreciated that any number of sensors may be employed and they may be disposed at any desirable location on the robotic mower 10. The sensors 60 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 60 may be used, at least in part, for determining the location of the robotic mower 10 relative to boundaries or other points of interest (e.g., a starting point or other key features) of the parcel 20, or determining a position history or track of the robotic mower 10 over time.

The base plate 50 may further support a cutting motor 62 configured to drive a cutting blade or other cutters of the robotic mower 10. In some embodiments, the outer housing 54 and the inner housing 52 may be plastic, light metal, or other similarly lightweight components. The inner housing 52 may include a cover 64 for the cutting motor 62. In some embodiments, a user interface (e.g., display 66) may be provided on the inner housing 3. The user interface may be employed to interface with the control circuitry 12 for controlling operations of the robotic mower 10.

In some embodiments, the sensors 60 may include sensors specifically provided for detecting objects (other than the boundary 30 or objects forming boundaries of the parcel 20) and/or sensors for detecting lifting (or tipping beyond a threshold amount) of the robotic mower 10. Alternatively, separate sensors (e.g., collision sensors 70 and lifting sensors 72) may be provided for each function, and those sensors may be capable of communicating with the control circuitry 12 in addition to the sensors 60. In some embodiments, a camera (not shown) may be provided at a portion of the robotic mower 10. In an example embodiment, the camera may be positioned at a forward portion of the robotic mower 10 to collect image data in front of the robotic mower 10. However, the camera may also be positioned in other locations in other embodiments, or may be excluded.

Figure 3:
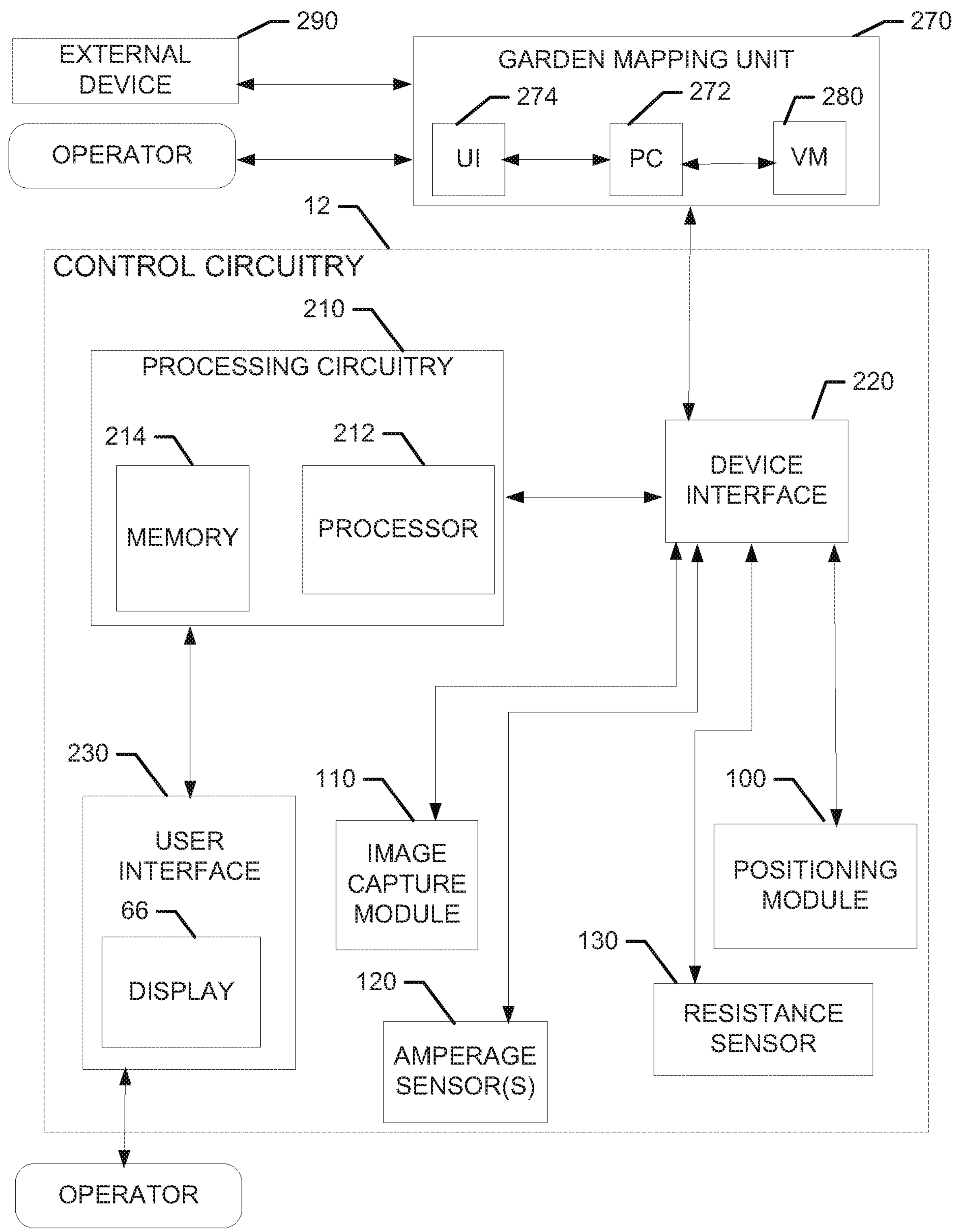
FIG. 3 illustrates a block diagram of various components of processing circuitry of a robotic vehicle to illustrate some of the components that enable the functional performance of the robotic vehicle and to facilitate description of an example embodiment.

FIG. 3 illustrates a block diagram of various components of the control circuitry 12 to illustrate some of the components that enable the functional performance of the robotic mower 10 and to facilitate description of an example embodiment. In some example embodiments, the control circuitry 12 may include or otherwise be in communication with a positioning module 100, an image capture module 110, and one or more amperage sensors 120 disposed at the robotic mower 10. As such, for example, the functions attributable to the positioning module 100, the image capture module 110, and/or the one or more amperage sensors 120 may be carried out by the control circuitry 12.

The control circuitry 12 may include processing circuitry 210 that may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230 (e.g., display 66). As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of the robotic mower 10 via a single data bus. As such, the data bus may connect to a plurality or all of the switching components and/or other electrically controlled components of the robotic mower 10.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the positioning module 100, the image capture module 110, and the amperage sensor(s). As such, in some embodiments, the processor 212 (or the processing circuitry 210) may be said to cause each of the operations described in connection with, for example, the positioning module 100 and the image capture module 110 by directing the positioning module 100 and the image capture module 110, respectively, to undertake the corresponding functionalities responsive to execution of instructions or algorithms configuring the processor 212 (or processing circuitry 210) accordingly.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 100 and/or the image capture module 110 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from various sensors or components of the robotic mower 10. Among the contents of the memory 214, applications may be stored for execution by the processor 212 in order to carry out the functionality associated with each respective application. In some cases, the applications may include an algorithm for capturing image data and/or workload data (e.g., amperage values associated with the draw of electrical current of one or more motors of the robotic vehicle) and correlating the image data and/or the workload data to the corresponding location of the robotic mower 10 at the time the image data and/or workload data was captured. Thus, the applications may include an algorithm to correlate image data and/or workload data with vehicle position (e.g., position data). However, in some cases, the applications may merely include applications for passing such data along to a garden mapping unit 270, which may perform the correlation described above among other things. The applications and/or algorithms may therefore include instructions for performing the functionality described herein when executed.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., display 66), one or more buttons or keys (e.g., function buttons), and/or other input/output mechanisms (e.g., microphone, speakers, cursor, joystick, lights and/or the like).

The device interface 220 may include one or more interface mechanisms for enabling communication with other devices either locally or remotely (e.g., the garden mapping unit 270). In some cases, the device interface 220 may be any means such as a device or circuitry embodied in either hardware, or a combination of hardware and software that is configured to receive and/or transmit data from/to sensors or other components in communication with the processing circuitry 210. In some example embodiments, the device interface 220 may provide interfaces for communication of data from the positioning module 100 and/or the amperage sensor(s) 120 (as shown in the example of FIG. 3) to the garden mapping unit 270 via wired or wireless communication interfaces in a real-time manner, as a data package downloaded after data gathering or in one or more burst transmission of any kind.

The positioning module 100 may be configured to utilize one or more sensors to determine a location of the robotic mower 10 and direct continued motion of the robotic mower 10 to achieve appropriate coverage of the parcel 20. As such, the robotic mower 100 (or more specifically, the control circuitry 12) may use the location information to determine a mower track and provide full coverage of the parcel 20 to ensure the entire parcel (or a discrete area therein) is mowed. The positioning module 100 may therefore be configured to direct movement of the robotic mower 10, including the speed of the robotic mower 10. Various sensors of the robotic mower 10 may be included as a portion of, or otherwise communicate with, the positioning module 100 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 100. For example, the positioning module 100 may record and/or provide positioning-information that may be correlated with workload-information, and/or image capture data to facilitate determining discrete areas within the entire parcel that are associated with an elevated workload (e.g., areas in which the robotic vehicle expends an increased level of energy to operate), reduced workload areas (e.g., areas in which the robotic vehicle expends a reduced level of energy to operate), or both.

The image capture module 110 may employ a camera to capture image data regarding the area around the robotic mower 10. The image data captured may be still images or video data. In any case, the image data may have metadata or other indicators associated therewith to enable the image data to be correlated to the time and/or date on which the image data was captured.

The garden mapping unit 270 may be a local module of the control circuitry 12 and may, therefore, be controlled by the processing circuitry 210 similar to the way the processing circuitry 210 controls operation of the positioning module 100 and image capture module 110 as described above. However, in other embodiments, the garden mapping unit 270 may be located remotely and may include its own separate instances of processing circuitry (e.g., processing circuitry 272), processor(s) and/or memory devices that may be similar to those described above in terms of form and/or function. The garden mapping unit 270 may also include its own user interface 274 to enable a remote operator to interact with the garden mapping unit 270. As such, for example, the garden mapping unit 270 may be provided at any of the example devices described above as instances of the electronic device 42 and the user interface 274 and processing circuitry 272 may be the corresponding user interface and processing circuitry of the electronic device 42.

Regardless of where the garden mapping unit 270 is instantiated, processing circuitry 272 of the garden mapping unit 270 may be configured to generate a virtual map 280 of the parcel 20 based on, for example, positioning-information and workload-information received from the positioning module 100 and the one or more amperage sensors 120, respectively. In some embodiments, the processing circuitry 272 of the garden mapping unit 270 may be further configured to generate the virtual map 280 based on the image capture data from the image capture module 110 in combination with the positioning-information and the workload-information. In this regard, position and heading information may be integrated with workload data and/or image data to generate a two or three dimensional map 280 of the parcel. The virtual map 280 may optionally then be interacted with by the user to enable the user to accomplish various tasks.

In some example embodiments, the virtual map 280 may be further enhanced based on input from external sources such as external device 290. The external device 290 could be a smartphone or other device with an image sensor (e.g., a high resolution camera) that may be further enabled to gather image and/or position information for incorporation into the model. As an example, the external device 290 may use VSLAM or other positioning technologies to generate accurate position and image data for incorporation with the image and/or position data that is gathered solely by the robotic mower 10. Due to the relatively low perspective of the robotic mower 10, the additional data from the external device 290 may provide better perspective, angles and/or resolution for generation of the virtual map 280 with enhanced accuracy and/or for a more complete virtual map. The garden mapping unit 270 may be configured to synchronize the data from the external device 290 with the positioning information, workload-information, and/or the image data from the robotic mower 10 so that all the data is properly correlated and reinforcing rather than conflicting.

The virtual map 280 may include a graphical representation of the parcel 20 and the graphical representation may identify areas associated with an elevated workload, areas associated with a reduced workload, or both located on the parcel 20. In some embodiments, for example, the virtual map may identify boundaries for the determined areas associated with an elevated workload, areas associated with a reduced workload, or both. The determined areas as defined by the identified boundaries, for example, may correspond to different work areas for operation of the robotic vehicle. For instance, content items (e.g., workload data, image data corresponding to actual camera images or video content, etc.) may be correlated with various locations or positions on the graphical representation. The content items may be visually represented on the graphical representation or may be selectable from or in association with the graphical representation of the virtual map 280. Thus, for example, the operator may select one or more content items and view an image captured of, from or otherwise in association with a particular location via interaction with the virtual map 280. For example, a user could select a content item associated with elevated workload data or reduced workload area and view an image captured of, from or otherwise associated with the particular location of interest via interaction with the virtual map 280. In this regard, a user may visually inspect, for example remotely, particular areas of interest (e.g., elevated and/or reduced workload areas) to confirm our check that nature of the terrain and/or vegetation located thereon. The user may, if desired, utilize this additional visual information to set or change an operational time-schedule and/or task-schedule.

In embodiments in which the graphical representation is a 2D representation, annotations on the representation may indicate the various structures and/or areas associated with the parcel 20 based on the virtual map 280. Content items may be selectable or thumbnail views may be provided for selection in association with various locations. In embodiments in which the graphical representation is a 3D representation, the content items may be used to generate three dimensional views of the parcel 20 or the 3D representation could include a topographical map and various content items associated with each location may again be accessible by selection of the content items.

In some cases, the virtual map 280 may have a timeline component or timeline function that allows content items or data associated with a given time or timeframe to be stored (and later accessed). Accordingly, for example, any content items generated at the selected time or in the selected timeframe may be presented or otherwise accessible via interaction with the virtual map 280. The operator may, therefore, be enabled to browse content items associated with a particular time or timeframe to compare changes to the parcel 20 over time or to identify or appreciate seasonal, weather related or other man-made or natural changes that may occur to the parcel 20. In the case where special sensors are employed for detecting soil pH, moisture content, or other parameters, information associated with sensor readings at various locations may also be recorded in association with the corresponding times at which the data was gathered.

Figure 4:
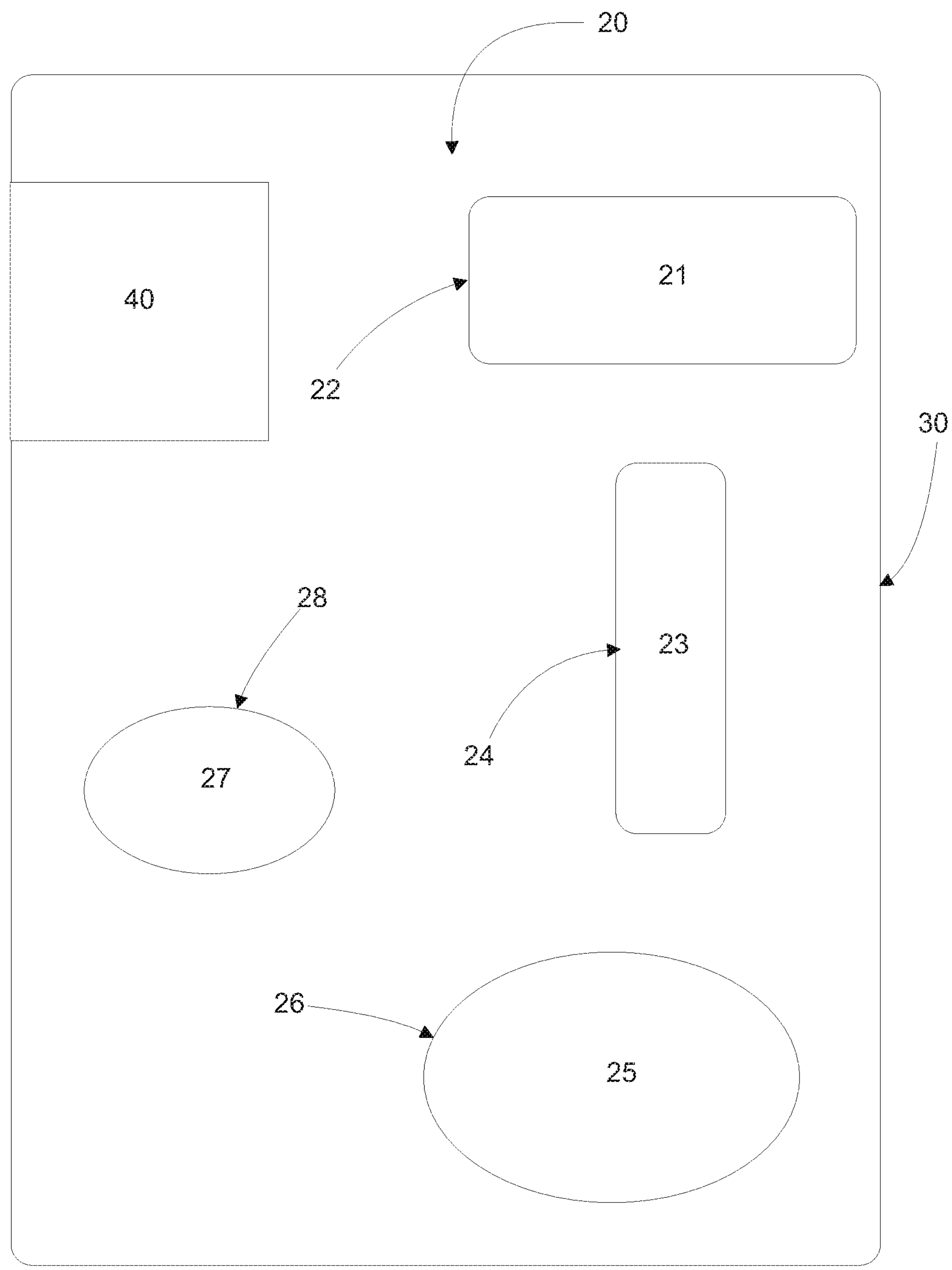
FIG. 4 illustrates a graphical representation of a parcel of land in accordance with an example embodiment.

FIG. 4 illustrates a graphical representation of a parcel in accordance with an example embodiment. The graphical representation of FIG. 4 is a 2D representation similar to a map view, but could easily be converted to 3D by the addition of topographical contour lines or other features (e.g., image views) to indicate features having a height dimension and/or reflect the contours of the terrain. The parcel 20 of FIG. 4 has the boundary 30 and charge station 40 indicated as described above. However, the parcel 20 also has a plurality of determined elevated workload areas 21, 23. A first elevated workload area 21 is defined by a first boundary 22 and a second elevated workload area 23 is defined by a second boundary 24. Along with the elevated workload areas 21, 23, the parcel 20 also includes a plurality of determined reduced workload areas 25, 27. As shown in FIG. 4, a first reduced workload area 25 is defined by a first boundary 26 and a second reduced workload area 27 is defined by a second boundary 28. The first and second elevated workload areas 21 and 23 may be designated by the processing circuitry or by an operator as areas that the robotic mower 10 is to operate within more frequently or to entirely avoid. Alternatively or additionally, reduced workload areas can also be designated as such by the processing circuitry or by the operator, and such areas can be assigned to be operated within with less frequency, or to be avoided entirely.

In some embodiments, each location in the parcel 20 may be assigned a grid position or other regional identifier. Content items (e.g., amperage data, image data, etc.) may be associated with the grid positions and may be accessed by the operator interacting with (e.g., selecting or requesting) the content items associated with each grid position. As mentioned above, the content items may be registered sequentially by time and by location. In some cases, the most recent content item for any particular grid position may be the default content item shown for each location when the operator selects a grid location. Alternatively, an icon, thumbnail view or other indicator may be placed on the map view itself, and the user may select the indicator to view data (e.g., image data, amperage data, etc.) for the location of interest. Selection of the indicator may show the most recently gathered image or workload data (e.g., amperage data) associated with the location. In some cases, the operator may cycle through other images or workload data (e.g., amperage data) associated with the location in a manner similar to a slide show presentation arranged by time. However, the operator could also designate specific times or time ranges, as described above.

In some embodiments, the robotic mower 10 may traverse the parcel 20 gathering image data and/or amperage data, in which all such data may be recorded in association with the location at which it was gathered, as described above. The robotic mower 10 could transmit the image, workload data (e.g., amperage data), position data, or any combination thereof to the charge station 40 or another remote device during operation (wirelessly) or could download the information to the charge station 40 (wired) while charging. In some cases, the operator could even direct the robotic mower 10 to proceed to a specific location to obtain data (e.g., image data, workload data, etc.) and direct the gathering of content items.

Accordingly, in some embodiments, the operator may be enabled to take a virtual tour through the various locations of the parcel 20 and retrieve data and/or images that are associated with each of the various locations. The operator may, for example, pass a mouse over various locations on a map view of the virtual map 280 and select or otherwise be automatically presented with content items associated with each of the various positions or locations. Moreover, when the timeline function is employed, the virtual tour may be associated with a specifically selected time or time period. However, real time touring may also be possible if the operator selects to view live data or even direct the robotic mower 10 to conduct a tour and send real-time or recent data for viewing. The live view or real-time data may also be used, for example, to generate a first person view that the operator could employ via a remote device to direct operation of the robotic mower 10.

The timeline function may serve as an event log so that potential problems or changes of interest may be identified either automatically or by the operator. For example, logged data may include workload data, pictures, or image data taken of various areas, structures, or situations on the parcel 20. The image and/or workload data may be presented to the operator so the operator can identify or appreciate the changes, or processing techniques may be employed to compare, for example, images of the same area at different times to identify objects or other changes and the operator may be notified of such changes (e.g., via email, MMS or other alerting mechanisms). Accordingly, for example, the garden mapping unit 270 may be configured to perform automatic change detection (e.g., based on image comparisons and/or workload data comparisons) and notification based, in some cases, on logged data. The logged data may therefore include images, sensor readings (e.g., workload data including amperage date of one or more motors associated with the robotic vehicle), component activity data and/or the like for given times or periods of time. Accordingly, for example, problems such as the robotic mower 10 getting stuck, areas with bad GPS coverage, areas with poor grass quality, swampy or dry areas, and/or the like may be identified and associated with the locations and times during which such conditions occurred. The information may be used to define or further define areas that the robotic mower 10 should avoid or take special actions when entering such areas. The occurrence of certain natural or artificial phenomena may therefore be monitored, such as the falling of a tree limb, the intrusion of an animal or person into a garden, or the leaving of toys, furniture or other objects on the parcel 20.

Embodiments of the present invention may therefore be practiced using an apparatus such as the one depicted in FIG. 3. However, other embodiments may be practiced in connection with a computer program product for performing embodiments of the present invention. As such, for example, each block or step of the flowcharts of FIGS. 5-6, and combinations of blocks in the flowcharts, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214) and executed by processing circuitry (e.g., processor 212).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 5-6. Moreover, other methods derived from the descriptions provided herein may also be performed responsive to execution of steps associated with such methods by a computer programmed to be transformed into a machine specifically configured to perform such methods.

In an example embodiment, a method for processing workload data (and optionally image data) and position information to generate a virtual map, which may be interactive, or other visualization of a garden or parcel may include object detection-related information, if desired. In such an example embodiment, the method may include receiving information indicative of position data of a robotic vehicle transiting a parcel and corresponding workload data captured by the robotic vehicle at one or more locations on the parcel at operation.

Figure 5:
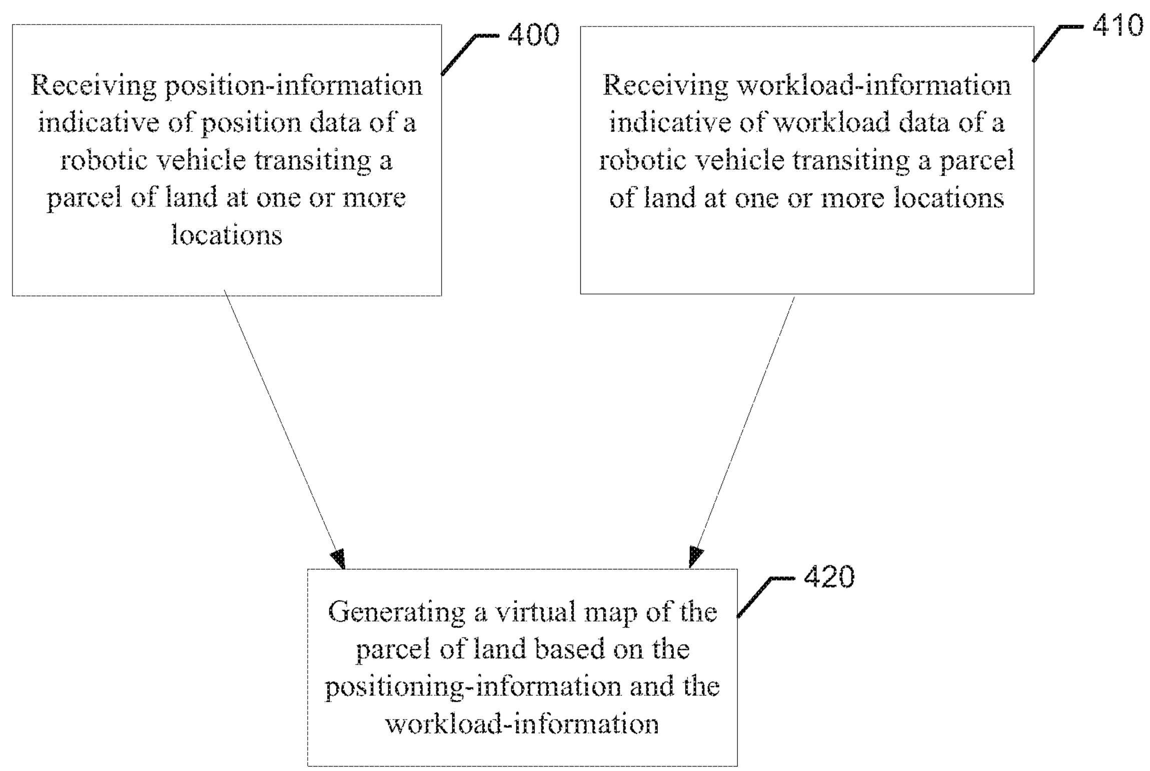
FIG. 5 illustrates a block diagram of a method according to an example embodiment.

In one example embodiment, as illustrated in FIG. 5, the method may comprise receiving positioning-information indicative of position data of a robotic vehicle transiting a parcel at one or more locations on the parcel 400 and receiving workload-information indicative of workload data of a robotic vehicle transiting the parcel at one or more locations on the parcel 410. The method may further comprise generating a virtual map of the parcel based on the positioning-information and the workload-information received 420.

Figure 6:
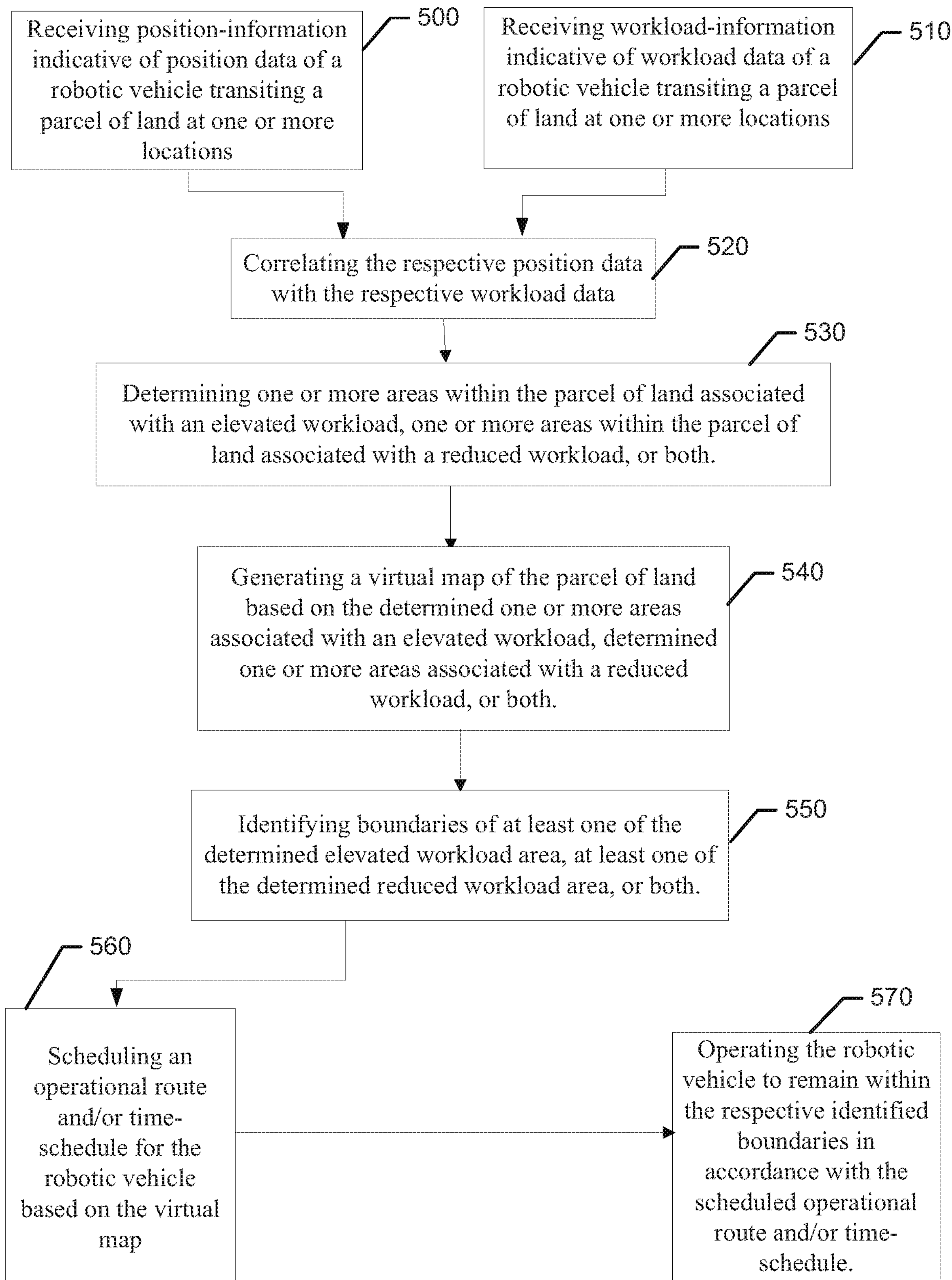
FIG. 6 illustrates a block diagram of a method according to an example embodiment.

In an additional example embodiment, as illustrated in FIG. 6, the method may comprise receiving positioning-information indicative of position data of a robotic vehicle transiting a parcel at one or more locations on the parcel 500 and receiving workload-information indicative of workload data of a robotic vehicle transiting the parcel at one or more locations on the parcel 510. The method may further comprise correlating the respective position data with the respective workload data 520. For instance, the position data may include at least a first position data point and a second position data point and the workload data may include at least a first workload data point and a second workload data point, in which correlating the position data and the workload data comprises associating or coupling at least the first position data point with the first workload data point and the second data point with the second workload data point. The position data, for example, may comprise GPS coordinates and the workload data comprises energy expenditure values associated with operation of the robotic vehicle. The energy expenditure values, for example, my comprise amperage values associated with one or more motors of the robotic vehicle. For example, the energy expenditure values may comprise amperage values associated with a cutting deck motor on the robotic vehicle and/or a drive motor associated with propelling the robotic vehicle. The amperage data, for instance, can include a first set of amperage data associated with the draw of electrical current associated with a cutting deck motor and a second set of amperage data associated with the draw of electrical current associated with a drive motor cutting for propelling the robotic vehicle.

The method illustrated by FIG. 6 may further comprise determining one or more areas with the parcel of land associated with an elevated workload, one or more areas within the parcel of land associated with a reduced workload, or both 530. For example, the entire parcel of land may comprise an average amount of energy expenditure (e.g., workload level) for operating the robotic vehicle. Areas within the parcel of land associated with a workload level (e.g., as represented by one or more sets of amperage data) greater than the average workload value (e.g., as represented by the average of one or more sets of amperage data over the entire parcel of land) for the entire parcel of land may, for example, comprise an elevated workload area. Similarly, areas within the parcel of land associated with a workload level (e.g., as represented by one or more sets of amperage data) less than the average workload value (e.g., as represented by the average of one or more sets of amperage data over the entire parcel of land) for the entire parcel of land may, for example, comprise a reduced workload area. The method may further comprise generating a virtual map of the parcel of land based, at least in part, on the determined one or more areas associated with an elevated workload, the determined one or more areas associated with a reduced workload, or both 540.

The method illustrated by FIG. 6 may further comprise identifying respective boundaries on the virtual map of at least one of the determined elevated workload areas, at least one of the determined reduced workload areas, or both 550. The method may further comprise scheduling an operational route, time-schedule, and/or task-schedule for the robotic vehicle based, at least in part, on the virtual map 560. As shown in FIG. 6, the method may further comprise operating the robotic vehicle to remain within the respective identified boundaries on the virtual map in accordance with the scheduled operational route, time-schedule, and/or task-schedule for the robotic vehicle 570.

In accordance with some embodiments, such as the embodiments illustrated in FIGS. 5-6, the methods may further comprise operating the robotic vehicle within the determined boundaries of at least one of the elevated workload areas more frequently than in the reduced workload areas. In some embodiments, for example, the robotic vehicle may operate in the elevated workload areas only when the robotic vehicle has at battery with a predetermined minimum charge. In such instances, for instance, the predetermined minimum charge may comprises about 25%, 50%, 75% of 90% of a fully charged battery or battery pack.

In some embodiments, the robotic vehicle comprises a mower and the methods may further comprise adjusting a cutting deck height of the mower based at least in part on the actual location of the mower and the virtual map. For example, the method may comprise increasing the cutting deck height when the mower is or will be located in one of the elevated workload areas identified on the virtual map. Similarly, the cutting deck height can be lowered based, at least in part, on the actual location of the mower and the virtual map.

In addition to the features described above, some methods may further comprise enabling an operator to interact with a graphical representation based on the virtual map to view one or more content items associated with respective ones of the one or more locations. For example, the graphical representation can identify elevated work areas associated with elevated workload data associated with one or more motors of the robotic vehicle. For instance, the elevated and reduced workload areas can be generated and/or identified based on a correlation of (i) position data and workload data (e.g., amperage data) associated with a cutting deck motor; (ii) position data and workload data (e.g., amperage data) associated with a drive motor for propelling the robotic vehicle; (iii) or position data, workload data (e.g., amperage data) associated with a cutting deck motor, and workload data (e.g., amperage data) associated with a drive motor for propelling the robotic vehicle.

In some embodiments, for example, the method may further comprising updating the virtual map based on supplemental data or supplemental location information received from an external device, in which the graphical representation being provided may be based on the virtual map after updating. Additionally or in the alternative, enabling the operator to interact with the graphical representation may comprise enabling the operator to define an area within the parcel and associate a task to be executed by the robotic vehicle within the area. In some embodiments, the method may comprise generating the virtual map at a charge station or a remote device relative to the robotic vehicle responsive to the information received being received from the robotic vehicle.

In an example embodiment, an apparatus for performing the methods of FIGS. 5-6 above, for example, may comprise processing circuitry (e.g., processing circuitry 272) that may include a processor (e.g., an instance of the processor 212 at the device hosting the garden mapping unit 270) configured to perform some or each of the operations (400-420), (500-570), and additional operations described above. The processing circuitry 272 may, for example, be configured to perform the operations (400-420) and (500-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (400-420) and (500-570) may comprise, for example, the control circuitry 12 or the processing circuitry 272.

Some example embodiments may also or alternatively provide a robotic vehicle that can be employed on hard surfaces such as paved walkways, and/or concrete and asphalt surfaces. Moreover, some example embodiments may employ snow removal equipment as the functional unit driven by the robotic vehicle during operation as described, for example, in FIGS. 7-11.

In an example embodiment, a robotic vehicle is provided with a positioning module capable of accurately determining robotic vehicle position relative to operational boundaries defined for the robotic vehicle. The robotic vehicle may also be provided with snow removal equipment.

Figure 7:
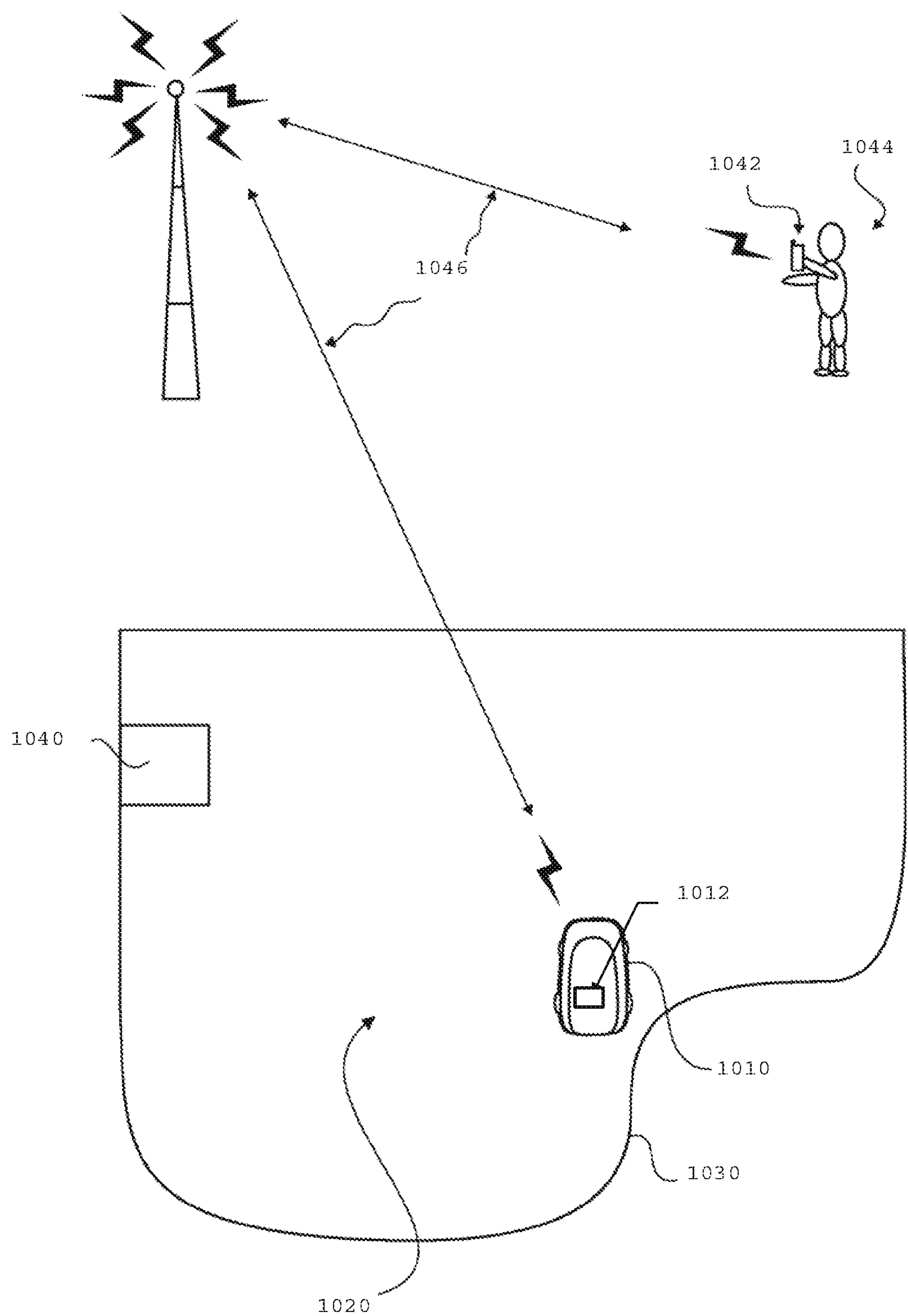
FIG. 7 illustrates an example operating environment for a robotic snow removal device that may employ an example embodiment.

FIG. 7 illustrates an example operating environment for a robotic snow removal device 1010 that may employ an example embodiment. The robotic snow removal device 1010 may operate to remove or otherwise reposition snow or other debris located with a bounded area 1020, the boundary 1030 of which may be defined using one or more physical boundaries (e.g., a fence, wall, curb and/or the like), a boundary wire, programmed location based boundaries or combinations thereof. The bounded area 1020 may generally be a hard surface such as a paved surface covered with stone, concrete, asphalt or other hard surface materials. As such, the bounded area 1020 may correlate to a walk way, a drive way, a parking lot, and/or the like.

The boundary 1030 may be learned and retained in memory of the robotic snow removal device 1010 on a permanent basis, or the boundary may be learned and retained temporarily during operation of the robotic snow removal device 1010. As such, for example, the robotic snow removal device 1010 may trace the boundary 1030 and remember coordinate locations for the boundary 1030, or the robotic snow removal device 1010 may be configured to find various reference points and generate the boundary 1030 relative to the reference points. In embodiments where the boundary 1030 is formed by a boundary wire, the boundary wire emit electrical signals that are detectable by the robotic snow removal device 1010 to inform the robotic snow removal device 1010 when a boundary of the bounded area 1020 has been reached. In such examples, the boundary wire may be buried or otherwise placed proximate to edges of the hard surface that is to be operated upon by the robotic snow removal device 1010.

The robotic snow removal device 1010 may be controlled, at least in part, via control circuitry 1012 located onboard. The control circuitry 1012 may control, among other things, a positioning module, a mobility assembly, and one or more functional units to perform a corresponding function responsive to movement of the robotic snow removal device 1010 about the bounded area 1020. Although not required, the control circuitry 1012 may also control operation of an object detection module, which may be configured to detect objects proximate to or encountered by the robotic snow removal device 1010 while the robotic snow removal device 1010 moves about the bounded area 1020. Accordingly, for example, the robotic snow removal device 1010 (e.g., via the positioning module) may utilize the control circuitry 1012 to define a path (or series of random paths) for coverage of the bounded area 1020 in terms of performing a task over specified portions or the entire bounded area 1020 while minimizing the impact and/or number of interactions with objects disposed on the bounded area 1020. In this regard, the positioning module may be used to guide the robotic snow removal device 1010 over the bounded area 1020 and to ensure that full coverage is obtained, while the object detection module (if employed) may detect objects and facilitate operation of the robotic snow removal device 1010 to avoid damage to the robotic snow removal device 1010 and the objects when such objects are detected.

In some embodiments, the control circuitry 1012 may be configured to communicate wirelessly with an electronic device 1042 (e.g., a computer, mobile telephone, PDA, smart phone, and/or the like) of a remote operator 1044 via a wireless communication network 1046. However, the wireless network 1046 and other remote devices may not be employed in some embodiments. The wireless network 1046 may be a data network, such as a local area network (LAN), a metropolitan area network (MAN), a wide area network (WAN) (e.g., the Internet), and/or the like, which may couple the robotic snow removal device 1010 to devices such as processing elements (e.g., personal computers, server computers or the like) or databases. Communication between the wireless network 1046 and the devices or databases (e.g., servers, electronic device 1042, control circuitry 1012, etc.) may be accomplished by either wireline or wireless communication mechanisms and corresponding protocols.

Figure 8:
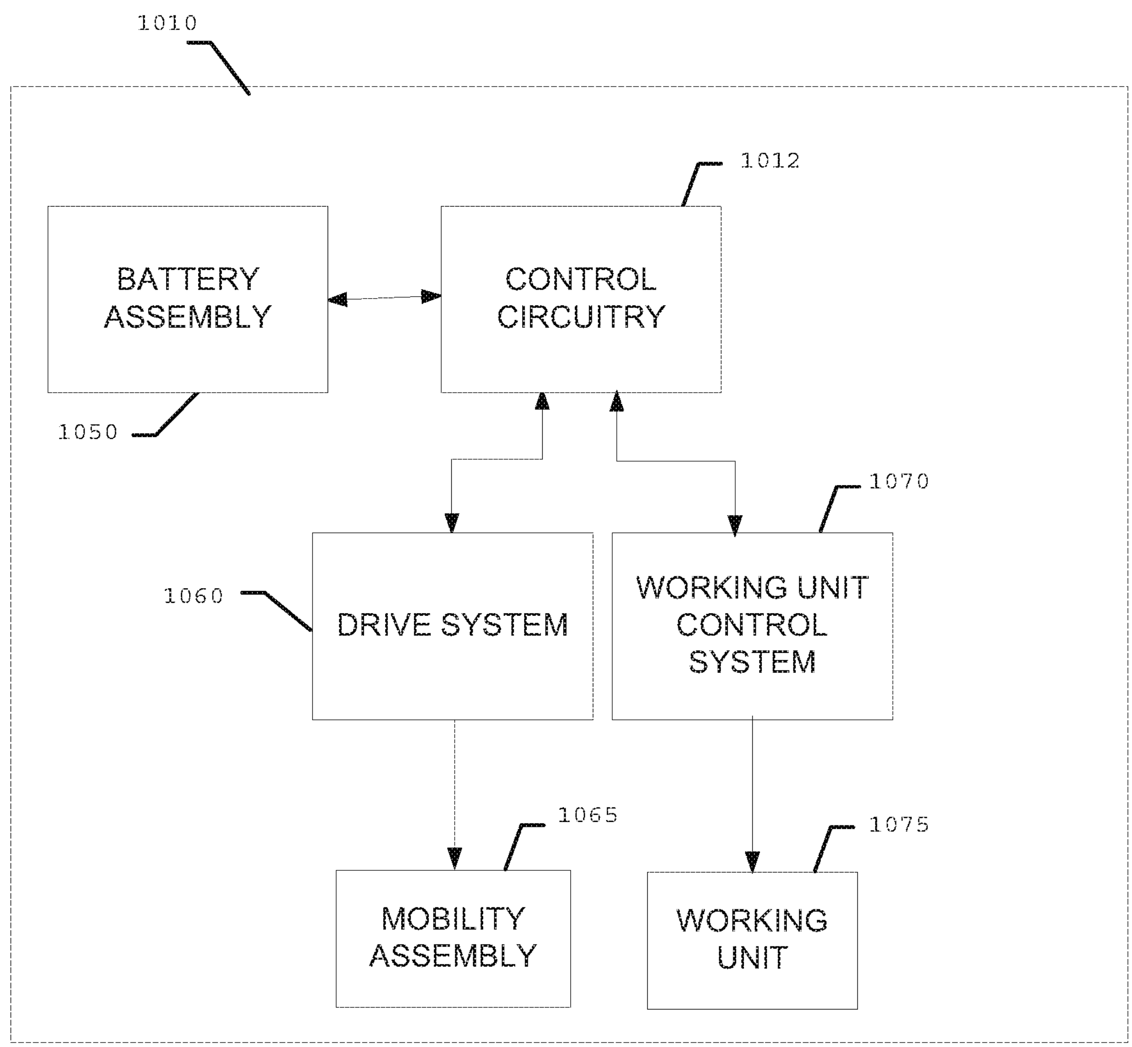
FIG. 8 illustrates a block diagram of various components of the robotic snow removal device to illustrate some of the components that enable the functional performance of the robotic snow removal device and to facilitate description of an example embodiment.

FIG. 8 illustrates a block diagram of the robotic snow removal device 1010 according to an example embodiment. In an example embodiment, the robotic snow removal device 1010 may be battery powered via one or more rechargeable batteries of a battery assembly 1050. Accordingly, the robotic snow removal device 1010 may be configured to return to a charge station 1040 (see FIG. 1) that may be located at some position on the bounded area 1020 in order to recharge the batteries of the battery assembly 1050. The battery assembly 1050 may power a drive system 1060 and a working unit control system 1070 of the robotic snow removal device 1010. However, the control circuitry 1012 of the robotic snow removal device 1010 may selectively control the application of power or other control signals to the drive system 1060 and/or the working unit control system 1070 to direct the operation of the drive system 1060 and/or the working unit control system 1070. The drive system 1060 may include an electric motor configured to power a mobility assembly 1065 (e.g., wheels). Similarly, the working unit control system 1070 may include an electric motor configured to power a working unit 1075.

Accordingly, movement of the robotic snow removal device 1010 over the bounded area 1020 may be controlled by the control circuitry 1012 in a manner that enables the robotic snow removal device 1010 to systematically traverse the bounded area 1020 while operating the working unit 1075 to remove snow or other debris on the bounded area 1020. As such, for example, the working unit 1075 may be rotating equipment configured to sweep, blow, throw or otherwise move snow or other debris encountered by the working unit 1075.

Figure 9:
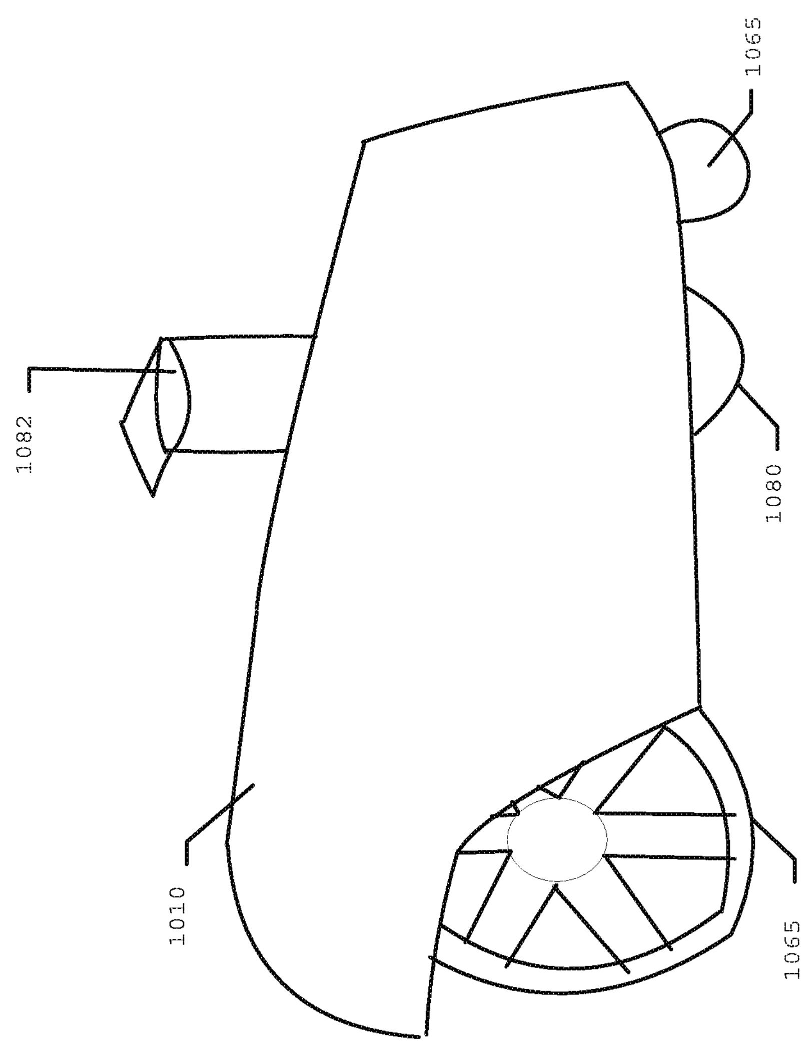
FIG. 9 illustrates a side view of the robotic snow removal device having an auger assembly in accordance with an example embodiment.

FIG. 9 illustrates a side view of one example embodiment of the robotic snow removal device 1010. In this example embodiment, the working unit 1075 may be embodied as an auger assembly 1080 for a single stage or dual stage snow blower. In such an embodiment, the auger assembly 1080 may be rotated to impart momentum on snow (or other debris) encountered by the auger assembly 1080 in order to propel the snow (or other debris) out of a discharge 1082 that may be positioned on a top or side of the robotic snow removal device 1010. The auger assembly 1080 (or at least the first stage thereof) may be configured to rotate about a first rotation axis that extends substantially perpendicular to the forward direction of motion of the robotic snow removal device 1010 (and the longitudinal axis of the robotic snow removal device 1010) while also extending parallel to the ground surface. If a second stage is employed, the second stage (e.g., a second stage impeller) may rotate about a second rotation axis that is substantially perpendicular to the first rotation axis and further imparts momentum on the snow prior to ejection through the discharge 1082.

Figure 10:
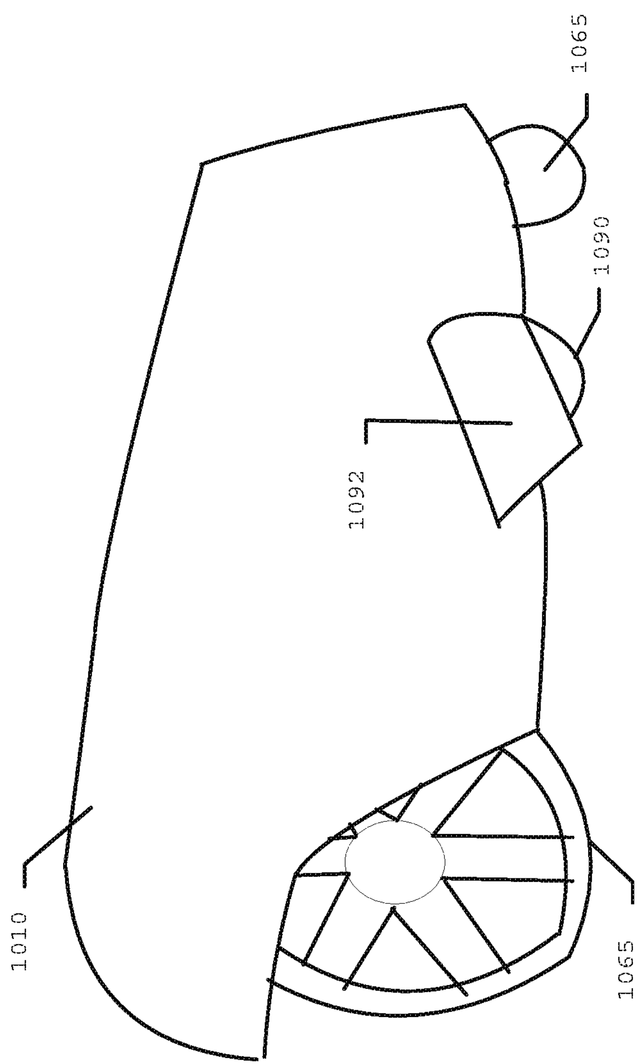
FIG. 10 illustrates a side view of the robotic snow removal device having a broom assembly in accordance with an example embodiment.

In some cases, the working unit 1075 may be embodied in other ways. FIG. 10 illustrates an example in which the working unit 1075 may be a broom assembly 1090. The broom assembly 1090 may be configured to push snow (or other debris) out a discharge 1092 positioned on a side of the robotic snow removal device 1010. The broom assembly 1090 may be configured to rotate about the first rotation axis that extends substantially perpendicular to the forward direction of motion of the robotic snow removal device 1010 (and the longitudinal axis of the robotic snow removal device 1010) while also extending parallel to the ground surface. However, in some cases the broom assembly 1090 may be alternatively configured to rotate about a third rotation axis that extends substantially perpendicular to the forward direction of motion of the robotic snow removal device 1010 (and the longitudinal axis of the robotic snow removal device 1010) while also extending perpendicular to the ground surface. Accordingly, in some embodiments, the broom assembly 1090 may be embodied as one or more brush heads attached to a cutting blade of a robotic mower to convert the robotic mower into a snow removal device.

Figure 11:
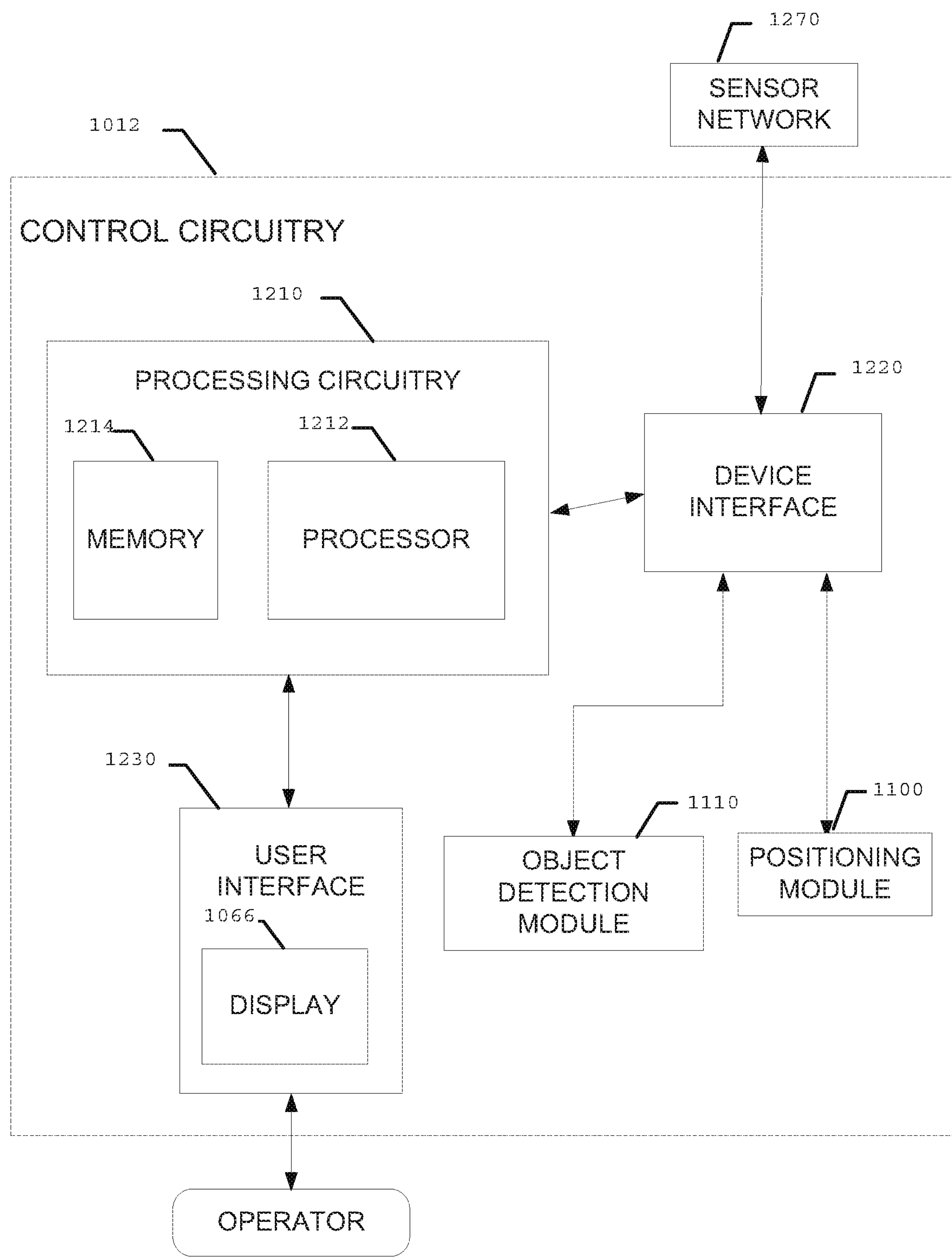
FIG. 11 illustrates a block diagram of control circuitry of the robotic snow removal device according to an example embodiment.

FIG. 11 illustrates a block diagram of various components of or controlled by the control circuitry 1012 to illustrate some of the components that enable the functional performance of the robotic snow removal device 1010 and to facilitate description of an example embodiment. In some example embodiments, the control circuitry 1012 may include or otherwise be in communication with positioning module 1100 and (in some cases) an object detection module 1110 disposed at the robotic snow removal device 1010. As such, for example, the functions attributable to the positioning module 1100 and/or the object detection module 1110 (if included) may be carried out or otherwise directed by the control circuitry 1012.

The control circuitry 1012 may include processing circuitry 1210 that may be configured to perform data processing, control function execution and/or other processing and management services according to an example embodiment of the present invention. In some embodiments, the processing circuitry 1210 may be embodied as a chip or chip set. In other words, the processing circuitry 1210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 1210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 1210 may include one or more instances of a processor 1212 and memory 1214 that may be in communication with or otherwise control a device interface 1220 and, in some cases, a user interface 1230. As such, the processing circuitry 1210 may be embodied as a circuit chip (e.g., an integrated circuit chip) configured (e.g., with hardware, software or a combination of hardware and software) to perform operations described herein. However, in some embodiments, the processing circuitry 1210 may be embodied as a portion of an on-board computer or embedded processor. In some embodiments, the processing circuitry 1210 may communicate with electronic components and/or sensors (e.g., of sensor network 1270) of the robotic snow removal device 1010 via a single data bus. As such, the data bus may connect to a plurality or all of the switching components and/or other electrically controlled components of the robotic snow removal device 1010.

The processor 1212 may be embodied in a number of different ways. For example, the processor 1212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 1212 may be configured to execute instructions stored in the memory 1214 or otherwise accessible to the processor 1212. As such, whether configured by hardware or by a combination of hardware and software, the processor 1212 may represent an entity (e.g., physically embodied in circuitry—in the form of processing circuitry 1210) capable of performing operations according to embodiments of the present invention while configured accordingly. Thus, for example, when the processor 1212 is embodied as an ASIC, FPGA or the like, the processor 1212 may be specifically configured hardware for conducting the operations described herein. Alternatively, as another example, when the processor 1212 is embodied as an executor of software instructions, the instructions may specifically configure the processor 1212 to perform the operations described herein.

In an example embodiment, the processor 1212 (or the processing circuitry 1210) may be embodied as, include or otherwise control the positioning module 1100 and the object detection module 1110. As such, in some embodiments, the processor 1212 (or the processing circuitry 1210) may be said to cause each of the operations described in connection with the positioning module 1100 and the object detection module 1110 by directing the positioning module 1100 and the object detection module 1110, respectively, to undertake the corresponding functionalities responsive to execution of instructions or algorithms configuring the processor 1212 (or processing circuitry 1210) accordingly.

In an exemplary embodiment, the memory 1214 may include one or more non-transitory memory devices such as, for example, volatile and/or non-volatile memory that may be either fixed or removable. The memory 1214 may be configured to store information, data, applications, instructions or the like for enabling the positioning module 1100 and/or the object detection module 1110 to carry out various functions in accordance with exemplary embodiments of the present invention. For example, the memory 1214 could be configured to buffer input data for processing by the processor 1212. Additionally or alternatively, the memory 1214 could be configured to store instructions for execution by the processor 1212. As yet another alternative, the memory 1214 may include one or more databases that may store a variety of data sets responsive to input from the sensor network. Among the contents of the memory 1214, applications may be stored for execution by the processor 1212 in order to carry out the functionality associated with each respective application. In some cases, the applications may include an algorithm for directing the robotic snow removal device 1010 to systematically cover the bounded area 1020 to remove or at least move snow or other debris deposited thereon using the working unit 1075.

The user interface 1230 (if implemented) may be in communication with the processing circuitry 1210 to receive an indication of a user input at the user interface 1230 and/or to provide an audible, visual, mechanical or other output to the user. As such, the user interface 1230 may include, for example, a display, one or more buttons or keys (e.g., function buttons), and/or other input/output mechanisms (e.g., microphone, speakers, cursor, joystick, lights and/or the like).

The device interface 1220 may include one or more interface mechanisms for enabling communication with other devices either locally (e.g., sensors of the sensor network 1270 and/or other accessories or functional units such as motors, servos, switches or other operational control devices for automatic responses) or remotely (e.g., electronic device 1042). In some cases, the device interface 1220 may be any means such as a device or circuitry embodied in either hardware, or a combination of hardware and software that is configured to receive and/or transmit data from/to sensors in communication with the processing circuitry 1210. In some example embodiments, the device interface 1220 may provide interfaces for communication of components internal to a positioning module 1100 and/or an object detection module 1110 (if employed). Automatic responses such as operational control functions that implement automatic actions to be taken responsive to detection of certain stimuli may also be provided via the device interface 1220 and the processing circuitry 1210. For example, shutdown of the working unit 1075 responsive to detecting an object or steering the robotic snow removal device 1010 appropriately to keep the robotic snow removal device 1010 in the bounded area 1020 responsive to detection of the boundary 1030.

In embodiments employing the sensor network 1270, some sensors of the sensor network 1270 may be a portion of (or in communication with) the positioning module 1100 and/or the object detection module 1110 and may include one or more contact sensors (e.g., collision sensors) and one or more contactless sensors (e.g., an ultrasonic sensor) disposed at any of various locations on the robotic snow removal device 1010. Other sensors may also be included as a portion of the positioning module 1100 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation.

The positioning module 1100 may be configured to utilize one or more sensors to determine a location of the robotic snow removal device 1010 and direct continued motion of the robotic snow removal device 1010 to achieve appropriate coverage of the bounded area 1020. As such, the robotic snow removal device 1100 (or more specifically, the control circuitry 1012) may use the location information to determine a snow removal device track and provide full coverage of the bounded area 1020 to ensure the entire bounded area is mowed. The positioning module 1100 may therefore be configured to direct movement of the robotic snow removal device 1010, including the speed and direction of the robotic snow removal device 1010. During normal operation, the positioning module 1100 may define a relatively systematic approach to coverage of the bounded area to attempt to move snow out of the bounded area and not simply move it repeatedly to other locations on the bounded area. As such, in some cases, the robotic snow removal device 1010 may determine the direction and distance to the nearest boundary and increase working unit 1075 power to attempt to achieve discharge of the snow outside the nearest boundary (e.g., via the positioning module 1100). However, in other cases, the positioning module 1100 may be used to direct a consistent direction of movement of the robotic snow removal device 1010 when the working unit 1075 is employed so that the robotic snow removal device 1010 can, for example, move snow from one boundary toward an opposing boundary, or move snow from a central region outward to the boundary 1030 by systematic driving while aiming the discharge outward while the working unit 1075 is operating. In other words, the positioning module 1100 may be configured to facilitate driving of the robotic snow removal device 1010 to move snow in a directionally consistent manner.

The object detection module 1110 may operate to determine when an object is detected. When an object is detected, the processing circuitry 1210 and/or the positioning module 1100 may be informed. In an example embodiment, after the initial detection of an object is accomplished, the processing circuitry 1210 and/or the positioning module 1100 may be informed so that the positioning module 1100 can initiate slowing or steering of the robotic snow removal device 1010 responsive to detection of the object so that any impact between the object and the robotic snow removal device 1010 may be avoided or at least will have less impact. Moreover, when an indication is received from the object detection module 1110 to inform the processing circuitry 1210 (and/or positioning module 1100) that the object has been detected, the processing circuitry 1210 may also record the detection event to determine or record a location at which the corresponding contact detection occurred.

The sensors of the sensor network 1270 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors of the sensor network 1270 may be used, at least in part, for determining the location of the robotic snow removal device 1010 relative to boundaries or other points of interest (e.g., a starting point or other key features)

of the bounded area 1020, or determining a position history or track of the robotic snow removal device 1010 over time.

In an example embodiment, the sensor network 1270 may provide data to the modules described above to facilitate execution of the functions described above, and/or any other functions that the modules may be configurable to perform. In some cases, the sensor network 1270 may include (perhaps among other things) an inertial measurement unit (IMU) and a GPS receiver. Generally speaking, the sensor network 1270 may include independent devices with on-board processing that communicate with the processing circuitry 1210 of the control circuitry 1012 via a single data bus, or via individual communication ports. However, in some cases, one or more of the devices of the sensor network 1270 may rely on the processing power of the processing circuitry 1210 of the control circuitry 1012 for the performance of their respective functions.

The IMU may include one or more and any or all of combinations of accelerometers, odometers, gyroscopes, magnetometers, compasses, and/or the like. As such, the IMU may be configured to determine velocity, direction, orientation and/or the like so that dead reckoning and/or other inertial navigation determinations can be made by the control circuitry 1012. The IMU may be enabled to determine changes in pitch, roll and yaw to further facilitate determining terrain features and/or the like.

Inertial navigation systems may suffer from integration drift over time. Accordingly, inertial navigation systems may require a periodic position correction, which may be accomplished by getting a position fix from another more accurate method or by fixing a position of the robotic snow removal device 1010 relative to a known location. For example, navigation conducted via the IMU may be used for robotic snow removal device 1010 operation for a period of time, and then a correction may be inserted when a GPS fix is obtained on robotic mower position. As an example alternative, the IMU determined position may be updated every time the robotic snow removal device 1010 returns to the charge station 1040 (which may be assumed to be at a fixed location). In still other examples, known reference points may be disposed at one or more locations on the bounded area 1020 and the robotic snow removal device 1010 may get a fix relative to any of such known reference points when the opportunity presents itself. The IMU determined position may then be updated with the more accurate fix information.

In some embodiments, the GPS receiver may be embodied as a real time kinematic (RTK)-GPS receiver. As such, the GPS receiver may employ satellite based positioning in conjunction with GPS, GLONASS, Galileo, GNSS, and/or the like to enhance accuracy of the GPS receiver. In some cases, carrier-phase enhancement may be employed such that, for example, in addition to the information content of signals received, the phase of the carrier wave may be examined to provide real-time corrections that can enhance accuracy.

In some cases, the control circuitry 1012 may be configured to act as a boundary management module to track or manage boundaries and operations relative to such boundaries. In an example embodiment, the boundary management module may store or have access to a plurality of different sets of boundaries. The sets of boundaries may each correspond to sets of stored positions or coordinate locations that form the boundaries. In some cases, the stored positions or coordinate locations may form a continuous or substantially continuous boundary within which the robotic snow removal device 1010 is operable. Thus, when the robotic snow removal device 1010 reaches or nears the boundary while monitoring its own position, the robotic snow removal device 1010 may turn to stay within the boundary. Other methods of boundary designation (with or without wires) may also be employed. For example, the boundaries may be traced on a map and the robotic snow removal device 1010 may plot its location on the map and operate to stay within the boundaries traced on the map. Still other methods are also possible.

A robotic snow removal device may therefore include a positioning module configured to direct movement of the robotic snow removal device, a drive system operational at least in part based on control of the positioning module where the drive system powers a mobility assembly of the robotic snow removal device, a working unit control system configured to control a working unit, and a battery assembly to selectively power the drive system and the working unit control system via control circuitry. The working unit includes rotating equipment configured to sweep, blow, throw or otherwise move snow encountered by the working unit.

In an example embodiment, the working unit comprises an auger assembly. In an example embodiment, the auger assembly includes a first stage configured to rotate about a first rotation axis that extends substantially perpendicular to the forward direction of motion of the robotic snow removal device while also extending parallel to a ground surface. In an example embodiment, the auger assembly further comprises a second stage configured to rotate about a second rotation axis that is substantially perpendicular to the first rotation axis and further imparts momentum on the snow prior to ejection through a discharge. In an example embodiment, the discharge is disposed at a top or side of the robotic snow removal device. In an example embodiment, the working unit comprises a broom assembly. In an example embodiment, the broom assembly rotates about a rotation axis that extends substantially perpendicular to the forward direction of motion of the robotic snow removal device while also extending parallel to the ground surface. In an example embodiment, the broom assembly rotates about a rotation axis that extends substantially perpendicular to the forward direction of motion of the robotic snow removal device while also extending perpendicular to the ground surface. In an example embodiment, the broom assembly comprises one or more brush heads attached to a cutting blade of a robotic mower to convert the robotic mower into a snow removal device. In an example embodiment, the broom assembly moves the snow out a discharge disposed at a side of the robotic snow removal device. In an example embodiment, the positioning module is configured to learn a permanent boundary within which the robotic snow removal device is to operate and retain the permanent boundary in memory. In an example embodiment, the positioning module is configured to learn a temporary boundary within which the robotic snow removal device is to operate, based on generating the temporary boundary relative to at least one reference point. In an example embodiment, the positioning module is configured to determine a distance to a nearest boundary and adjust working unit power based on the distance. In an example embodiment, the positioning module is configured to direct a consistent direction of movement of the robotic snow removal device when the working unit is employed to enable the robotic snow removal device to move snow in a directionally consistent manner. In an example embodiment, the positioning module is configured to direct movement of the robotic snow removal device to provide movement of snow from one boundary toward an opposing boundary. In an example embodiment, the positioning module is configured to direct movement of the robotic snow removal device to provide movement of snow from a central region outward to the boundary by systematic driving while aiming the discharge outward while the working unit is operating.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:

receiving, via a positioning module of a robotic vehicle, positioning-information indicative of position data of the robotic vehicle transiting a parcel at one or more locations on the parcel;

receiving, via a sensor of the robotic vehicle, workload-information indicative of workload data of the robotic vehicle transiting the parcel at one or more locations on the parcel, the workload data defining an amount of energy output of the robotic vehicle;

generating a virtual map of the parcel having position-based workload indications by correlating the positioning-information with the workload-information;

determining, based on the virtual map, an area within the parcel associated with an elevated workload based on the positioning-information and the workload-information, wherein the area associated with the elevated workload is an area where an energy expenditure rate for the robotic vehicle based on the energy output is greater than an average energy expenditure rate for the parcel;

identifying, on the virtual map, boundaries defining the area within the parcel associated with the elevated workload;

scheduling an operational route or a time-schedule for the robotic vehicle based on the workload-information of the virtual map, wherein the operational route covers the area within the parcel associated with the elevated workload;

causing the robotic vehicle to operate within the area within the parcel associated with the elevated workload more frequently than other areas within the parcel, the robotic vehicle being configured to enter the area within the parcel associated with the elevated workload when a battery of the robotic work tool is charged to greater than a threshold level charge;

providing a graphical representation of the boundaries defining the area within the parcel associated with the elevated workload based on the virtual map; and enabling an operator to interact with a representation of the area within the parcel associated with the elevated workload identified on the virtual map to confirm or change the operational route or the time-schedule for the robotic vehicle.

2. The method of claim 1, wherein the position data comprises GPS coordinates.

3. The method of claim 1, wherein the amount of energy output comprises amperage values associated with:

one or more motors of the robotic vehicle, a cutting deck motor on the robotic vehicle, or a drive motor associated with propelling the robotic vehicle.

4. The method of claim 1, wherein the positioning information includes at least a first position data point and a second position data point and the workload-information includes at least a first workload data point and a second workload data point; and wherein correlating the positioning-information with the workload-information comprises associating at least the first position data point with the first workload data point and the second data point with the second workload data point.

5. The method of claim 1, further comprising determining a reduced workload area within the parcel associated with a reduced workload.

6. The method of claim 5, wherein the virtual map identifies boundaries defining the determined reduced workload areas within the parcel.

7. The method of claim 1, wherein the robotic vehicle is a mower and wherein the method further comprises increasing the cutting deck height when the mower is or will be located in at least one of the elevated workload areas identified on the virtual map.

8. The method of claim 1, further comprising updating the virtual map based on supplemental data or supplemental location information received from an external device, the graphical representation being provided based on the virtual map after updating.

9. The method of claim 1, wherein generating the virtual map comprises generating the virtual map at a charge station or a remote device relative to the robotic vehicle responsive to the information received being received from the robotic vehicle.

10. The method of claim 1, wherein enabling the operator to interact with the graphical representation further comprises enabling the operator to define a task area within the parcel and associate a task to be executed by the robotic vehicle within the task area.

11. The method of claim 1 further comprising measuring the amount of energy output of the robotic vehicle via an amperage sensor; and storing the measured output of the robotic vehicle in association with the positioning-information for respective positions of the robotic vehicle where the output of the robotic vehicle is measured.

12. The method of claim 1, wherein scheduling comprises scheduling the operational route and a time-schedule for the robotic vehicle based on the workload-information of the virtual map.

13. The method of claim 1 further comprising receiving, via a camera of the robotic vehicle, image capture data indicative of images captured by the robotic vehicle transiting the parcel at one or more locations on the parcel; and wherein generating the virtual map comprises generating the virtual map of the parcel by correlating the positioning-information with the workload-information and the image capture data.

14. The method of claim 1, wherein causing the robotic vehicle to operate within the area within the parcel associated with the elevated workload includes adjusting a height of a cutting deck of the robotic vehicle in response to the robotic vehicle crossing over the boundaries defining the area within the parcel associated with the elevated workload.

15. The method of claim 14, wherein adjusting the height of the cutting deck comprises increasing a height of the cutting deck of the robotic vehicle in response to the robotic vehicle crossing over the boundaries defining the area within the parcel associated with the elevated workload.

16. An apparatus comprising processing circuitry configured for:

receiving, via a positioning module of a robotic vehicle, positioning-information indicative of position data of the robotic vehicle transiting a parcel at one or more locations on the parcel;

receiving, via a sensor of the robotic vehicle, workload-information indicative of workload data of the robotic vehicle transiting the parcel at one or more locations on the parcel, the workload data defining an amount of energy output of the robotic vehicle;

generating a virtual map of the parcel having position-based workload indications by correlating the positioning-information with the workload-information;

determining, based on the virtual map, an area within the parcel associated with an elevated workload based on the positioning-information and the workload-information, wherein the area associated with the elevated workload is an area where an energy expenditure rate for the robotic vehicle is greater than an average energy expenditure rate for the parcel;

identifying, on the virtual map, boundaries defining the area within the parcel associated with the elevated workload;

scheduling an operational route or a time-schedule for the robotic vehicle based on the workload-information of the virtual map, wherein the operational route covers the area within the parcel associated with the elevated workload;

causing the robotic vehicle to operate within the area within the parcel associated with the elevated workload more frequently than other areas within the parcel, the robotic vehicle being configured to enter the area within the parcel associated with the elevated workload when a battery of the robotic work tool is charged to greater than a threshold level charge;

providing a graphical representation of the boundaries defining the area within the parcel associated with the elevated workload based on the virtual map; and enabling an operator to interact with a representation of the area within the parcel associated with the elevated workload identified on the virtual map to confirm or change the operational route or the time schedule for the robotic vehicle.

17. The apparatus of claim 16, wherein the processing circuitry is further configured determine a reduced workload area within the parcel associated with a reduced workload.

18. A robotic vehicle comprising:

a positioning module configured to guide the robotic vehicle over a parcel;

a sensor configured to measure a resistance applied to a wheel of the robotic vehicle as the robotic vehicle transits over the parcel; and processing circuitry configured to:

receive, via the positioning module, positioning-information indicative of position data of the robotic vehicle transiting the parcel at one or more locations on the parcel;

receive, via the sensor, workload-information indicative of the resistance applied to the wheel of the robotic vehicle transiting the parcel at the one or more locations on the parcel;

generate a virtual map of the parcel having position-based workload indications by correlating the positioning-information with the workload-information;

determine, based on the virtual map, an area within the parcel associated with an elevated workload based on the positioning information and the workload-information, wherein the area associated with the elevated workload is an area where an energy expenditure rate for the robotic vehicle is greater than an average energy expenditure rate for the parcel;

identify, on the virtual map, boundaries defining the area within the parcel associated with the elevated workload;

schedule an operational route or a time-schedule for the robotic vehicle based on the workload-information of the virtual map, wherein the operational route covers the area within the parcel associated with the elevated workload;

cause the robotic vehicle to operate within the area within the parcel associated with the elevated workload more frequently than other areas within the parcel, the robotic vehicle being configured to enter the area within the parcel associated with the elevated workload when a battery of the robotic work tool is charged to greater than a threshold level charge;

provide a graphical representation of the boundaries defining the area within the parcel associated with the elevated workload based on the virtual map; and enable an operator to interact with a representation of the area within the parcel associated with the elevated workload identified on the virtual map to confirm or change the operational route or the time schedule for the robotic vehicle.

19. The robotic vehicle of claim 18, wherein the processing circuitry is further configured to determine at least one reduced workload area within the parcel associated with a reduced workload.

20. The robotic vehicle of claim 19, wherein the virtual map further identifies boundaries defining the reduced workload area within the parcel.

* * * * *